(12) United States Patent
Zverina et al.

(10) Patent No.: US 10,506,301 B2
(45) Date of Patent: Dec. 10, 2019

(54) SYSTEMS AND METHODS FOR AUTOMATICALLY INSERTING ADVERTISEMENTS INTO LIVE STREAM VIDEOS

(71) Applicant: Facebook, Inc., Menlo Park, CA (US)

(72) Inventors: Maria Zverina, London (GB); Dariia Stroganova, London (GB)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/807,532

(22) Filed: Nov. 8, 2017

(65) Prior Publication Data
US 2019/0141410 A1    May 9, 2019

(51) Int. Cl.
*H04N 21/431*    (2011.01)
*H04N 21/81*    (2011.01)
*H04N 21/234*    (2011.01)
*G06Q 30/02*    (2012.01)
*H04N 21/2387*    (2011.01)
*H04N 21/472*    (2011.01)

(52) U.S. Cl.
CPC ....... *H04N 21/812* (2013.01); *G06Q 30/0251* (2013.01); *H04N 21/2387* (2013.01); *H04N 21/23418* (2013.01); *H04N 21/23424* (2013.01); *H04N 21/47202* (2013.01); *H04N 21/4316* (2013.01)

(58) Field of Classification Search
CPC .................................................. H04N 21/4316
See application file for complete search history.

(56) References Cited

U.S. PATENT DOCUMENTS

| | | | |
|---|---|---|---|
| 2009/0235312 A1* | 9/2009 | Morad | G06Q 30/02 725/44 |
| 2010/0161635 A1* | 6/2010 | Dey | G06Q 30/0241 707/758 |
| 2011/0251896 A1* | 10/2011 | Impollonia | G06Q 30/02 705/14.55 |
| 2013/0276008 A1* | 10/2013 | Wu | H04N 21/42209 725/14 |
| 2013/0278760 A1* | 10/2013 | Beams | H04N 7/18 348/143 |
| 2017/0208256 A1* | 7/2017 | Lin | G06Q 30/0623 |
| 2017/0228936 A1* | 8/2017 | Goslin | G06T 19/006 |

* cited by examiner

*Primary Examiner* — Michael H Hong
(74) *Attorney, Agent, or Firm* — Sheppard Mullin Richter & Hampton LLP

(57) ABSTRACT

Systems, methods, and non-transitory computer readable media can identify one or more of a store or a product depicted in a live stream video. An advertisement associated with the store or the product can be generated. The advertisement can be inserted into the live stream video.

20 Claims, 10 Drawing Sheets

SYSTEMS AND METHODS FOR AUTOMATICALLY INSERTING ADVERTISEMENTS INTO LIVE STREAM VIDEOS

FIELD OF THE INVENTION

The present technology relates to the field of social networks. More particularly, the present technology relates to computer networking techniques for dynamically generating content associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide resources through which users may publish content items. In one example, a content item can be presented on a profile page of a user. As another example, a content item can be presented through a feed for a user to access. In some cases, a content item can include a live stream video.

SUMMARY

Various embodiments of the present disclosure can include systems, methods, and non-transitory computer readable media configured to identify one or more of a store or a product depicted in a live stream video. An advertisement associated with the store or the product can be generated. The advertisement can be inserted into the live stream video.

In some embodiments, the store or the product is identified based on one or more of: object detection, object recognition, voice recognition, speech recognition, beacon technology, a barcode, or a QR code.

In certain embodiments, the advertisement is associated with a summary view and a detailed view, wherein the summary view is initially provided to a user and the detailed view is provided to the user in response to selection of a user interface (UI) element.

In an embodiment, the summary view includes one or more of: an image associated with the store, a name of the store, an image of the product, or a name of the product.

In some embodiments, the detailed view includes one or more of: a website of the store, details relating to the store, a webpage of the product, details relating to the product, or a media content item.

In certain embodiments, the advertisement is provided in the live stream video as an overlay.

In an embodiment, the advertisement is provided within a threshold distance from the identified store or the product in the live stream video.

In some embodiments, the advertisement is provided in a particular section of a user interface providing the live stream video.

In certain embodiments, a user associated with the live stream video opts in to inserting advertisements into the live stream video or all live stream videos of the user.

In an embodiment, a user associated with the live stream video approves the advertisement for insertion into the live stream video.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
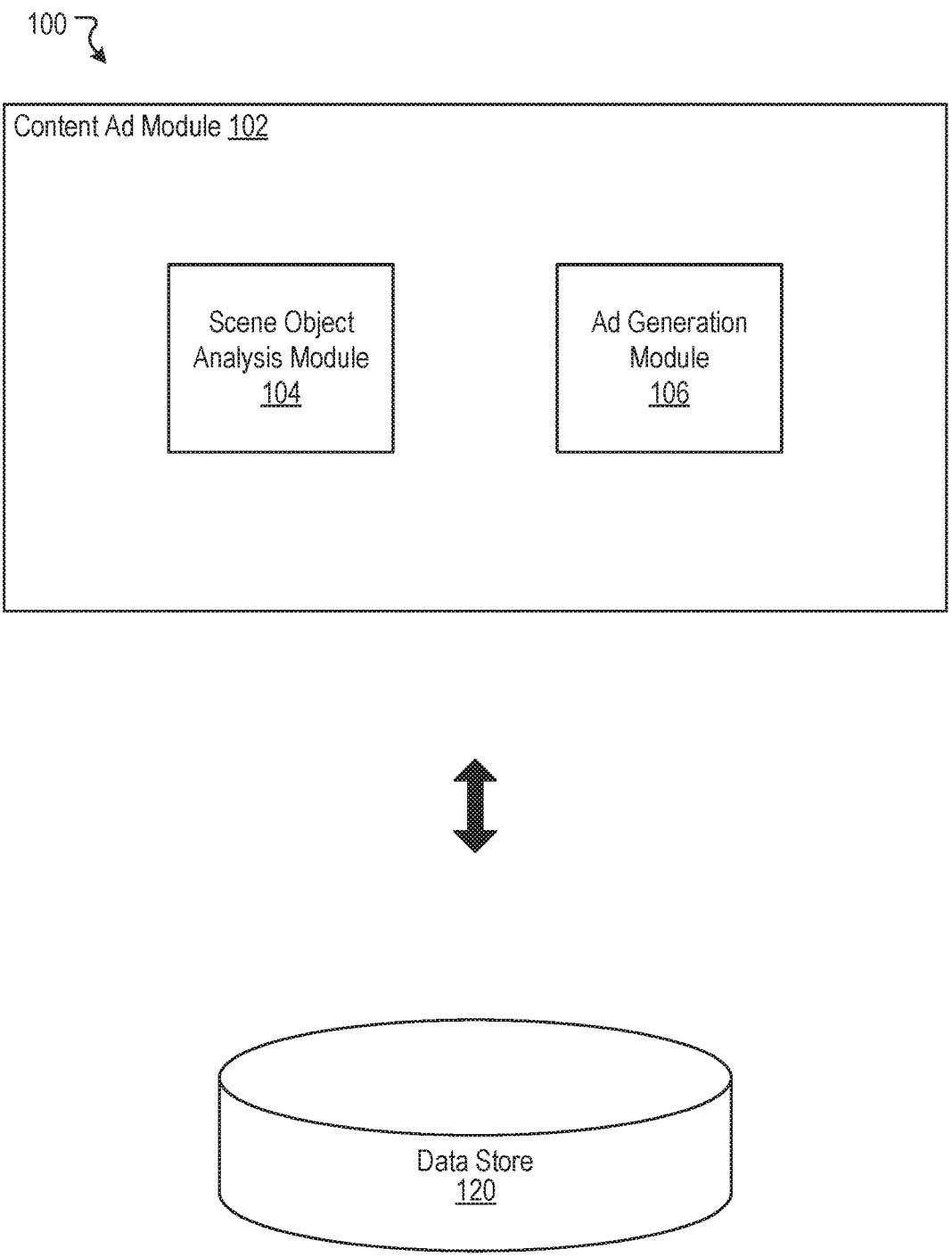
FIG. 1 illustrates an example system including an example content ad module configured to provide advertisements in live stream videos, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Automatically Inserting Advertisements into Live Stream Videos

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide resources through which users may publish content items. In one example, a content item can be presented on a profile page of a user. As another example, a content item can be presented through a feed for a user to access.

Conventional approaches specifically arising in the realm of computer technology can provide live stream videos. For example, a user can start recording a video and broadcast the video in real time to other users. A live stream video can depict various scenes and objects, such as a store and products in a store. However, under conventional approaches, users viewing the live stream video may not access information about depicted scenes and/or objects directly from the live stream video itself. For instance, if the live stream video depicts a store or products in a store, the users viewing the live stream video may have to search for the store or products online to obtain information about them.

An improved approach rooted in computer technology can overcome the foregoing and other disadvantages associated with conventional approaches specifically arising in the realm of computer technology. Based on computer technology, the disclosed technology can analyze scenes and objects in live stream videos and automatically insert advertisements ("ads") associated with the scenes and objects into the live stream videos. For example, the disclosed technology can identify stores or products in stores depicted in live stream videos and generate ads associated with identified stores or products. Stores or products depicted in live stream videos can be identified based on various techniques, such as object detection/recognition, voice recognition, speech recognition, beacon technology, barcodes, and QR codes. In some embodiments, an ad for a store or a product can include a summary view and a detailed view. The summary view can provide basic information associated with a store or a product, such as an image or a name. The detailed view can provide details relating to the store or the product and may be provided in response to user request for additional information. In this manner, the disclosed technology can provide information relating to scenes or objects depicted in live stream videos directly within the live stream videos and facilitate user access to the information. Additional details relating to the disclosed technology are provided below.

FIG. 1 illustrates an example system 100 including an example content ad module 102 configured to provide advertisements in live stream videos, according to an embodiment of the present disclosure. The content ad module 102 can analyze scenes and objects in live stream videos and automatically insert advertisements ("ads") associated with the scenes and objects into the live stream videos. For example, the content ad module 102 can identify stores or products in stores depicted in live stream videos and generate ads associated with the identified stores or products. By generating and inserting ads into live stream videos, the content ad module 102 can provide convenient access to more information about stores and products presented in the live stream videos. As used herein, a "store" can include, for example, a business, a nonprofit, an organization, etc., while a "product" can include, for example, an offering (e.g., product, service, etc.) or any item or endeavor associated with a store. While the content ad module 102 is herein described in connection with stores and products for illustrative purposes, the content ad module 102 can apply to any other types of depicted entities or concepts with which an advertisement may be associated. Likewise, although live stream videos are referenced as examples herein, insertion of ads by the content ad module 102 applies equally to videos on demand, including video recordings of live stream videos and videos that did not involve live streaming.

Live stream videos may be provided through a social networking system in which the content ad module 102 is implemented. As used herein, a user recording and broadcasting a live stream video that is processed by the content ad module 102 can be referred to as a "streaming user." A user viewing a live stream video can be referred to as a "viewing user." For example, a streaming user can begin recording a live stream video and transmit the live stream video in real time to a server associated with the social networking system. The server associated with the social networking system can in turn transmit the live stream video to one or more viewing users. For instance, the one or more viewing users may view the live stream video in a user interface associated with the social networking system. A live stream video can be in any format. For example, a live stream video can be two-dimensional (2D) media content or three-dimension (3D) media content. Examples of a live stream video can include a 2D video and a 360 video, among others. In some instances, the content ad module 102 can be implemented in or as, for example, an augmented reality environment.

The content ad module 102 can include a scene object analysis module 104 and an ad generation module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the content ad module 102 can be implemented in any suitable combinations. While the disclosed technology is described in connection with ads associated with live stream videos in a social networking system for illustrative purposes, the disclosed technology can apply to any other type of system and/or any other type of content.

The scene object analysis module 104 can analyze scenes and objects in live stream videos. For example, the scene object analysis module 104 can identify stores or products in stores depicted in live stream videos based on various techniques. Functionality of the scene object analysis module 104 is described in more detail herein.

The ad generation module 106 can generate ads to insert into live stream videos. The ad generation module 106 can generate one or more ads for identified stores or products depicted in live stream videos. Functionality of the ad generation module 106 is described in more detail herein.

In some embodiments, the content ad module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content ad module 102 can be, in part or in whole, implemented as software running on one or more computing devices or systems, such as on a server system or a client computing device. In some instances, the content ad module 102 can be, in part or in whole, implemented within or configured to operate in conjunction or be integrated with a social networking system (or service), such as a social networking system 630 of FIG. 6. Likewise, in some instances, the content ad module 102 can be, in part or in whole, implemented within or configured to operate in conjunction or be integrated with a client computing device, such as the user device 610 of FIG. 6. For example, the content ad module 102 can be implemented as or within a dedicated application (e.g., app), a program, or an applet running on a user computing device or client computing system. The application incorporating or implementing instructions for performing functionality of the content ad module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The data store 120 can be configured to store and maintain various types of data, such as the data relating to support of and operation of the content ad module 102. The data maintained by the data store 120 can include, for example, information relating to live stream videos, scenes, objects, stores, products, ads, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the content ad module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
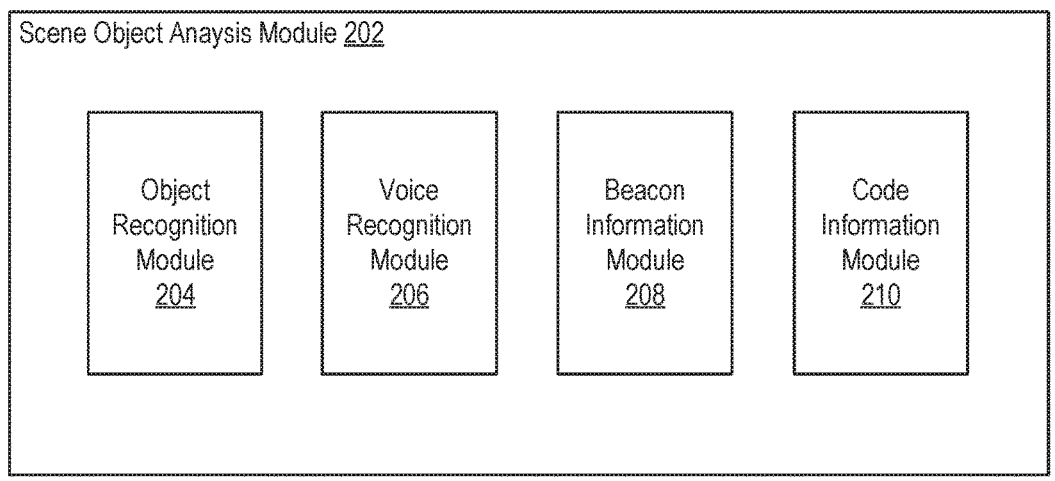
FIG. 2A illustrates an example scene object analysis module configured to analyze scenes and objects in live stream videos, according to an embodiment of the present disclosure.

FIG. 2A illustrates an example scene object analysis module 202 configured to analyze scenes and objects in live stream videos, according to an embodiment of the present disclosure. In some embodiments, the scene object analysis module 104 of FIG. 1 can be implemented with the example scene object analysis module 202. As shown in the example of FIG. 2A, the example scene object analysis module 202 can include an object recognition module 204, a voice recognition module 206, a beacon information module 208, and a code information module 210. The scene object analysis module 202 can identify stores and/or products in stores depicted in live stream videos based on analysis of scenes and objects depicted in the live stream videos. Various techniques can be used to identify stores and/or products in stores. For example, a store and/or a product can be identified based on object detection or recognition, voice recognition or speech recognition, beacon technology, code reading or scanning techniques, as discussed below. Many variations are possible. As indicated above, the disclosed technology is described in connection with stores and products for illustrative purposes, and can apply to any other types of entities. In some embodiments, the scene object analysis module 202 can also identify entities or content depicted in live stream videos other than stores and products.

The object recognition module 204 can detect and recognize objects depicted in a live stream video. For example, the object recognition module 204 can detect and recognize objects based on machine learning techniques, such as object detection or recognition techniques. In some embodiments, the object recognition module 204 can train a machine learning model based on training data that includes images of objects and corresponding labels. Frames or images of a live stream video can be applied to the trained machine learning model in order to determine objects depicted in the live stream video. In some embodiments, objects can move from one frame to another within a live stream video, and objects can be tracked between frames in order to detect the objects. One or more machine learning models discussed in connection with the content ad module 102 and its components can be implemented separately or in combination, for example, as a single machine learning model, as multiple machine learning models, as one or more staged machine learning models, as one or more combined machine learning models, etc.

The object recognition module 204 can identify stores depicted in a live stream video based on detected objects in the live stream video. For example, the object recognition module 204 may recognize buildings, such as stores or storefronts, and determine that a detected object in a live stream video is a store. The object recognition module 204 may determine the identity of a store based on the name of the store when the name is depicted in the live stream video, based on location information, etc. In some embodiments, the name of a store can be determined based on optical character recognition (OCR) when the name appears in the live stream video. In some embodiments, the object recognition module 204 can also identify products in a store depicted in a live stream video. For example, the object recognition module 204 may recognize any types of products, such as clothing, shoes, automobiles, beverages, furniture, etc. In some embodiments, the object recognition module 204 can identify duplicates of the same product in a live stream video. For example, a store can have on display multiple instances of the same product, such as clothing. An ad can be provided for a detected store or a product, as discussed below.

The voice recognition module 206 can identify stores depicted in a live stream video based on voice recognition or speech recognition techniques. In some embodiments, the voice recognition module 206 can identify stores based on natural language processing (NLP). The voice recognition module 206 can analyze words spoken by a streaming user or others whose verbal expressions are captured by the live stream video to determine whether a store is being depicted in a live stream video. For instance, there can be one or more flag words that can indicate a store is being mentioned by a streaming user. As an example, a flag word can be "store," and the voice recognition module 206 can identify a word that follows the word "store" as the name of a store. As another example, recognized words or verbal expressions can be compared with and matched to a database of known stores. In some embodiments, the voice recognition module 206 can also identify products in a store depicted in a live stream video based on similar voice recognition or speech recognition techniques. For instance, there can be one or more flag words indicating that a product is being mentioned, and recognized words or verbal expressions can be compared with and matched to a database of known products.

The beacon information module 208 can receive information relating to beacons communicated by stores. A beacon can include, for example, a wireless signal or other mechanism to provide information or to attract attention to a specific location. A store may have one or more beacons within the store or in proximity of the store. While a streaming user is recording a live stream video using a computing device, an exterior or an interior of a store may be depicted in the lives stream video. The computing device can detect a beacon associated with the store and obtain identifying information relating to the store communicated by or encoded in the beacon. The computing device can identify the store based on the identifying information from the beacon and send information about the identity of the store to the beacon information module 208. Or the computing device can send the identifying information from the beacon to the beacon information module 208, and the beacon information module 208 can identify the store based on the identifying information from the beacon. The beacon information module 208 can recognize that the live stream video is depicting the store based on the information received from the computing device. In some embodiments, a beacon may be detected based on near field communication (NFC) techniques. In some cases, there may be multiple beacons associated with different stores in close proximity to each other. In an example, booths at a fair may each have a unique beacon, and it may be difficult to identify a particular booth depicted in a live stream video based on the presence of different beacons. In these cases, information from beacons can be supplemented with information based on other techniques, such as object recognition and/or voice recognition described above so that the depicted booth can be confidently identified. In some embodiments, information about multiple detected beacons can be provided to a streaming user, and the streaming user can manually select one of the multiple detected beacons as a beacon associated with a store depicted in a live stream video. In some embodiments, the beacon information module 208 can also identify products in a store depicted in a live stream video based on beacons when the beacons contain information identifying the products.

The code information module 210 can receive information relating to codes associated with products. While a streaming user is recording a live stream video on a computing device, products in a store may be depicted in the live stream video. The streaming user may scan or read a code associated with a product in the store, such as a barcode or a QR code, using the computing device, and the product can be identified based on the code. Information relating to the identified product can be sent from the computing device to the code information module 210, and the code information module 210 can recognize that the live stream video is depicting the product based on the received information relating to the product. In some embodiments, information from codes can be supplemented with information based on other techniques, such as object recognition and/or voice recognition described above. In some embodiments, the code information module 210 can also recognize a store depicted in a live stream video based on codes, such as barcodes or QR codes. For example, the streaming user may scan or read a code associated with a store using the computing device, and the store can be identified based on the code. Information relating to the identified store can be sent from the computing device to the code information module 210. All examples herein are provided for illustrative purposes, and there can be many variations and other possibilities.

Figure 2B:
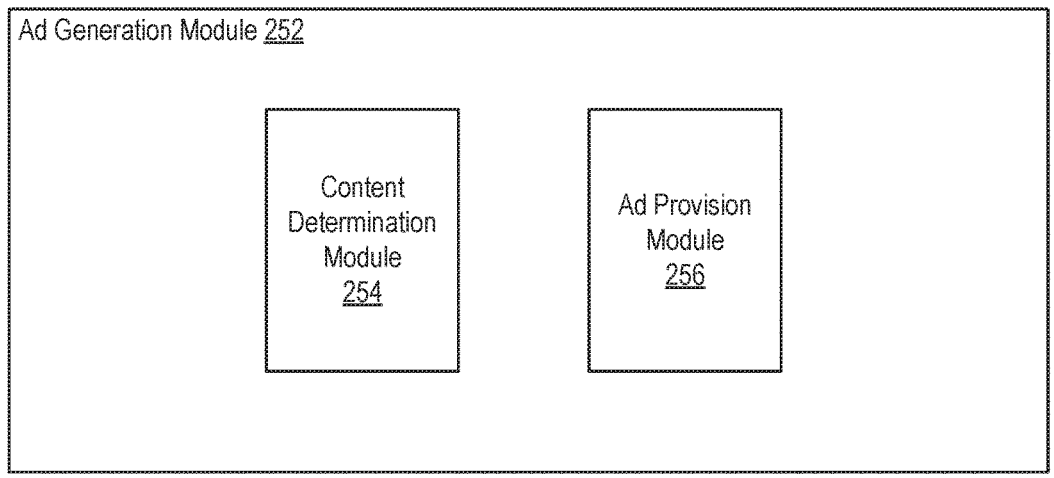
FIG. 2B illustrates an example ad generation module configured to generate ads to insert into live stream videos, according to an embodiment of the present disclosure.

FIG. 2B illustrates an example ad generation module 252 configured to generate ads to insert into live stream videos, according to an embodiment of the present disclosure. In some embodiments, the ad generation module 106 of FIG. 1 can be implemented with the example ad generation module 252. As shown in the example of FIG. 2B, the example ad generation module 252 can include a content determination module 254 and an ad provision module 256. The ad generation module 252 can generate one or more ads to be inserted into a live stream video based on identified stores or products depicted in the live stream video. In some embodiments, a streaming user can opt in to automatically inserting ads into a specific live stream video or all live stream videos. In other embodiments, a streaming user can manually approve any ads to be inserted into a live stream video. Many variations are possible.

The content determination module 254 can determine content of an ad to insert into a live stream video. The content of an ad can be determined based on stores and/or products identified by the scene object analysis module 202. An ad can be presented in any appropriate format. In some embodiments, an ad can include a summary view and/or a detailed view. A summary view can initially be provided to a viewing user. A detailed view can be provided to a viewing user if the viewing user requests detailed information. For example, a viewing user can select a user interface (UI) element in the summary view to view detailed information. Examples of UI elements can include a button, an icon, a link, an image, etc. A detailed view of an ad can include various types of information. Examples of the detailed view can include store information, product information for one or more products, a website of a store, a webpage for a product, a page of a store on a social networking system, a media content item. In some embodiments, a media content item can include a video or an image, such as a 360 video or a 360 image or photo. In certain embodiments, an ad can include one or more calls-to-action (CTAs). For example, a CTA can indicate a particular action on a social networking system that can be taken in connection with a store or a product.

In some embodiments, the content determination module 254 can provide an ad for a store. For example, a summary view of an ad for a store can include the name of the store and an image or a photo associated with the store. If a store has a page in the social networking system, the summary view can include a profile photo of the store from the page and a link to the page. A detailed view of an ad for a store can include details about the store (e.g., location, hours, contact information, etc.), representative or popular products of the store, a website of the store, a page of the store, a media content item, etc. In some embodiments, a media content item can include a video or an image, such as a 360 video or a 360 image or photo. Many variations are possible.

In certain embodiments, the content determination module 254 can provide an ad for one or more products of a store. For example, the content determination module 254 can provide a summary view of an ad for a product that includes the name of the product and a small photo of the product. As another example, the content determination module 254 can provide a detailed view of an ad for a product that includes a large photo of the product, details about the product, a webpage for the product, a section of a page of the store relating to the product, a media content item, etc. In some embodiments, a media content item can include a video or an image, such as a 360 video or a 360 image or photo. Many variations are possible. In some embodiments, a store can have a product catalog, and information about a product to include in an ad can be obtained from the product catalog. For example, the product catalog can be available from the social networking system.

The ad provision module 256 can automatically insert one or more generated ads into a live stream video. In some embodiments, the ad provision module 256 can insert a generated ad into a live streaming video for presentation to a viewing user without a need for the viewing user to take specific action or otherwise perform a specific command to cause generation or presentation of the ad. An ad may be inserted into a live stream video as an overlay. In some embodiments, an ad can be provided as a pop up window. An ad can be generated for some or all stores and/or products identified in a live stream video. In some cases, an ad can be generated for only some of stores and/or products identified in a live stream video in order to avoid including too many ads within the live stream video. In some cases, stores and/or products for which to show ads can be determined based on machine learning techniques. For example, a machine learning can be trained to predict stores and/or products with which a viewing user is likely to engage. An ad for a store or a product can be displayed within a live stream video for a predetermined time period, while the store or the product is depicted in the live stream video, etc. In some embodiments, some or all ads included in a live stream video may appear at the end of the live stream video. As an example, a user interface providing the live stream video can show a representative frame of the live stream video after the live stream video ends, and all ads included in the live stream video can appear over the frame as a list of ads or cards representing ads. Many variations are possible.

The ad provision module 256 can initially provide a summary view of an ad. For example, a summary view of an ad can be provided next to or in close proximity of (e.g., within a threshold distance from) a related store or a product in a live stream video. As another example, a summary view of an ad can be provided at a particular section of a user interface providing a live stream video. For instance, the summary view can appear at the bottom of the live stream video. As a further example, a map showing an area including the location of a store can be inserted into a live stream video, and a summary view of an ad for the store can be provided on the map, or next to or in close proximity of (e.g., within a threshold distance from) the map. For instance, the location of the store can be indicated with a pin or another indicator on the map. The ad provision module 256 can provide a detailed view of an ad in response to user selection of a UI element in a summary view of the ad.

In some embodiments, multiple stores or products may be identified in a live stream video at the same time. For example, a scene captured in the live stream video can include two or more stores or two or more products. In some cases, the ad provision module 256 can provide ads for multiple stores or multiple products in sequence such that an ad for only one store or product is shown at a time in the live stream video. In other cases, the ad provision module 256 can provide ads for only some of the identified stores or products. In certain cases, the ad provision module 256 may provide ads for all of the identified stores or products. In some embodiments, duplicates of the same product may be identified in a live stream video. For example, a store can have on display multiple instances of the same product, such as clothing. In these embodiments, the ad provision module 256 can provide an ad for only one instance of an identified product in order to prevent providing multiple ads for the same product.

In some embodiments, ads can be generated after a live stream video has ended. For example, a live stream video can be recorded and stored after live streaming ends, and the ad generation module 252 can generate ads to insert into the stored live stream video. In certain embodiments, ads can be generated for videos that are not created from live streaming. Accordingly, during playback of such videos (e.g., videos on demand) by a user, the user can be presented with the ads inserted by the ad generation module 252. All examples herein are provided for illustrative purposes, and there can be many variations and other possibilities.

Figure 3A:
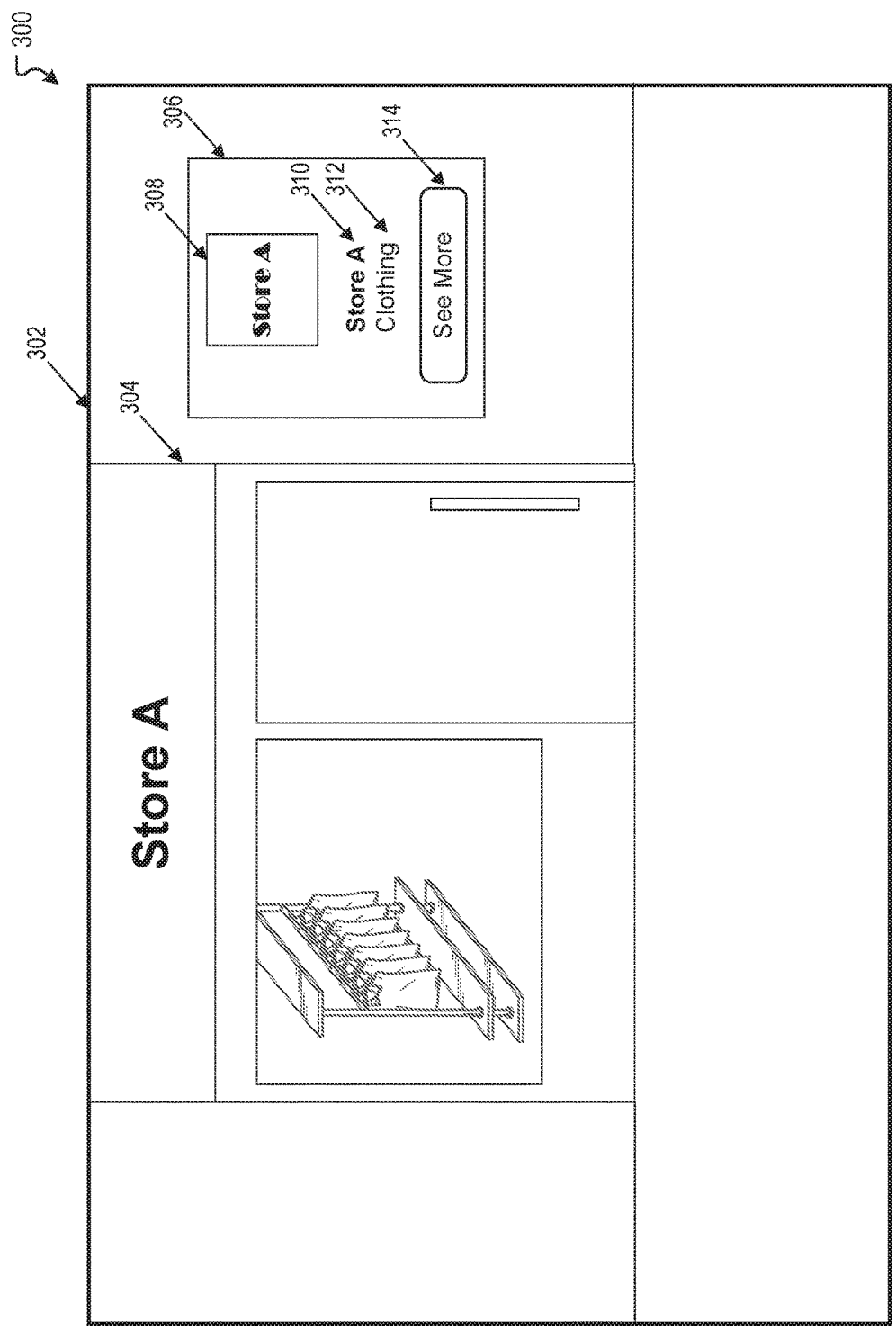
FIGS. 3A-3C illustrate example user interfaces for providing advertisements in live stream videos, according to an embodiment of the present disclosure.

FIG. 3A illustrates an example user interface 300 for providing advertisements in live stream videos, according to an embodiment of the present disclosure. In the example of FIG. 3A, the user interface 300 presents a live stream video 302 that depicts a store 304. For example, the storefront of the store 304 has a store sign, a door, and a window, and a rack of shirts inside the store 304 is visible through the window. The store 304 in the live stream video 302 can be identified by the content ad module 102 as described above. An ad 306 can be generated for the store 304 and inserted into the live stream video 302. The ad 306 can be generated by the content ad module 102 as described above. In the example of FIG. 3A, the ad 306 is a summary view. The ad 306 can include an image 308 associated with the store 304, a name 310 of the store 304, a category 312 associated with the store 304, and a button 314 for accessing additional information associated with the store 304. The ad 306 can be displayed next to or in proximity of the store 304 in the live stream video 302. The ad 306 can be displayed to a viewing user for a predetermined time after the store 304 is first depicted in the live stream video 302 or for an entire duration during which the store 304 is depicted in the live stream video 302. All examples herein are provided for illustrative purposes, and there can be many variations and other possibilities.

Figure 3B:
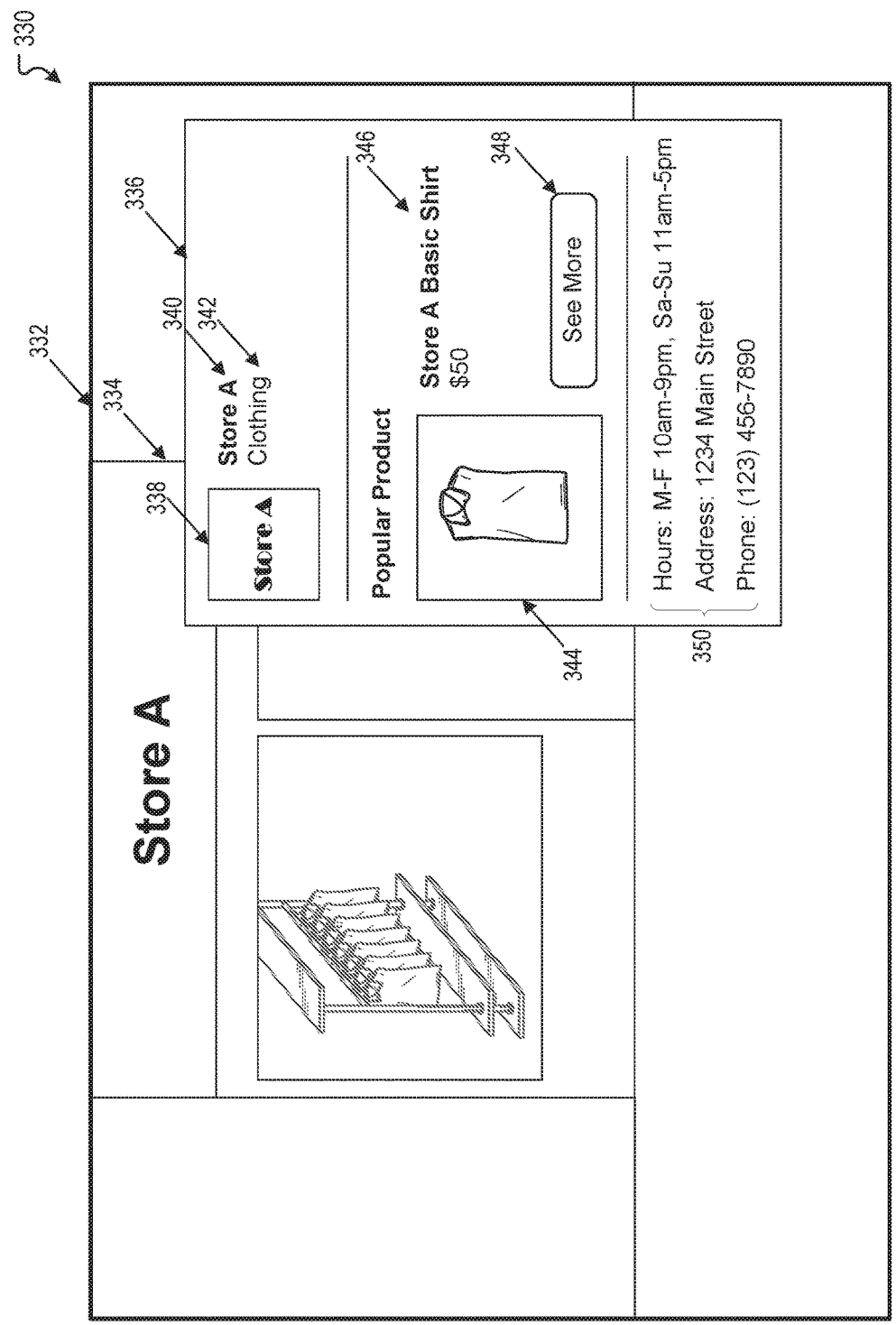

FIG. 3B illustrates an example user interface 330 for providing advertisements in live stream videos, according to an embodiment of the present disclosure. FIG. 3B is similar to FIG. 3A, except that the user interface 330 shows a detailed view of an ad for a store. For example, the live stream video 332, the store 334, and the ad 336 can correspond to the live stream video 302, the store 304, and the ad 306 in FIG. 3A, respectively. In the example of FIG. 3B, the ad 336 is a detailed view. For example, the detailed view can be shown if a viewing user selects the button 314 in FIG. 3A. In the example of FIG. 3B, the ad 336 includes an image 338 of the store 334, a name 340 of the store 334, a category 342 associated with the store 334, an image 344 of a product associated with the store 334 (e.g., a popular or trending product), information associated with the product, a button 348 for accessing additional information associated with the product, and details 350 relating to the store 334. Many variations are possible. The ad 336 can be displayed to a viewing user for a predetermined time after the store 334 is first depicted in the live stream video 332 or for an entire duration during which the store 334 is depicted in the live stream video 332. All examples herein are provided for illustrative purposes, and there can be many variations and other possibilities.

Figure 3C:
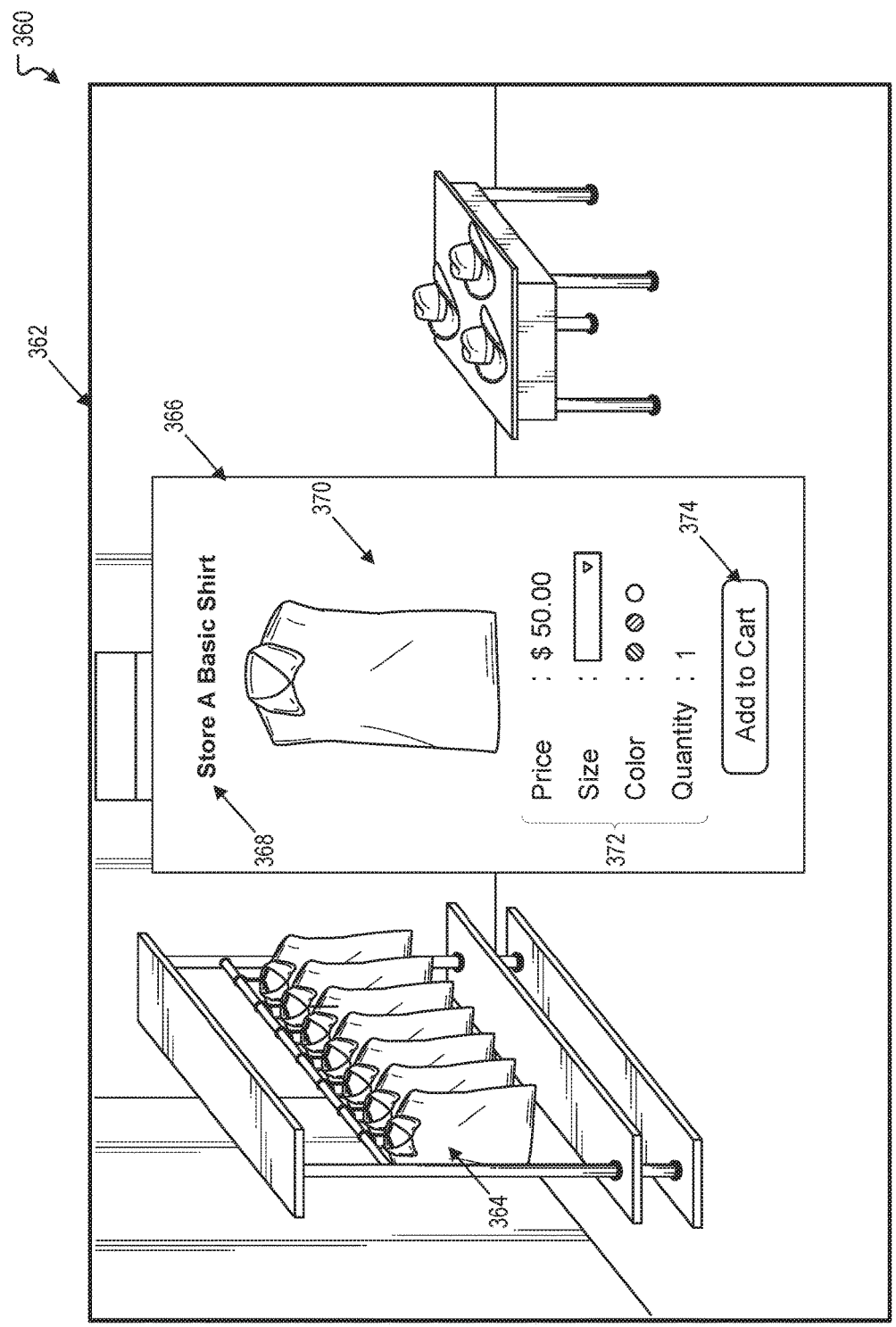

FIG. 3C illustrates an example user interface 360 for providing advertisements in live stream videos, according to an embodiment of the present disclosure. In the example of FIG. 3C, the user interface 360 presents a live stream video 362 that depicts an interior of a store. For example, the store can be the store 304, 334 in FIGS. 3A and 3B. In the example of FIG. 3C, a product 364 (e.g., a shirt) is identified in the live stream video 362, and an ad 366 is provided for the identified product 364. The product 364 can be identified by the content ad module 102 as described above. The ad 366 can be generated for the product 364 and inserted into the live stream video 362. The ad 366 can be generated by the content ad module 102 as described above. The ad 366 shown in FIG. 3C can be a summary view or a detailed view, depending on the embodiment. In the example of FIG. 3C, the ad 366 can include a name 368 of the product 364, an image 370 of the product 364, details 372 relating to the product 364, and a button 374 for taking an action in connection with the product 364. In the example of FIG. 3C, the button 374 relates to adding the product 364 to a shopping cart. The live stream video 362 depicts multiple instances of the product 364, but the ad 366 is shown for only one instance of the identified product 364. The ad 366 can be displayed to a viewing user for a predetermined time after the product 364 is first depicted in the live stream video 362 or for an entire duration during which the product 364 is depicted in the live stream video 362. All examples herein are provided for illustrative purposes, and there can be many variations and other possibilities.

Figure 4:
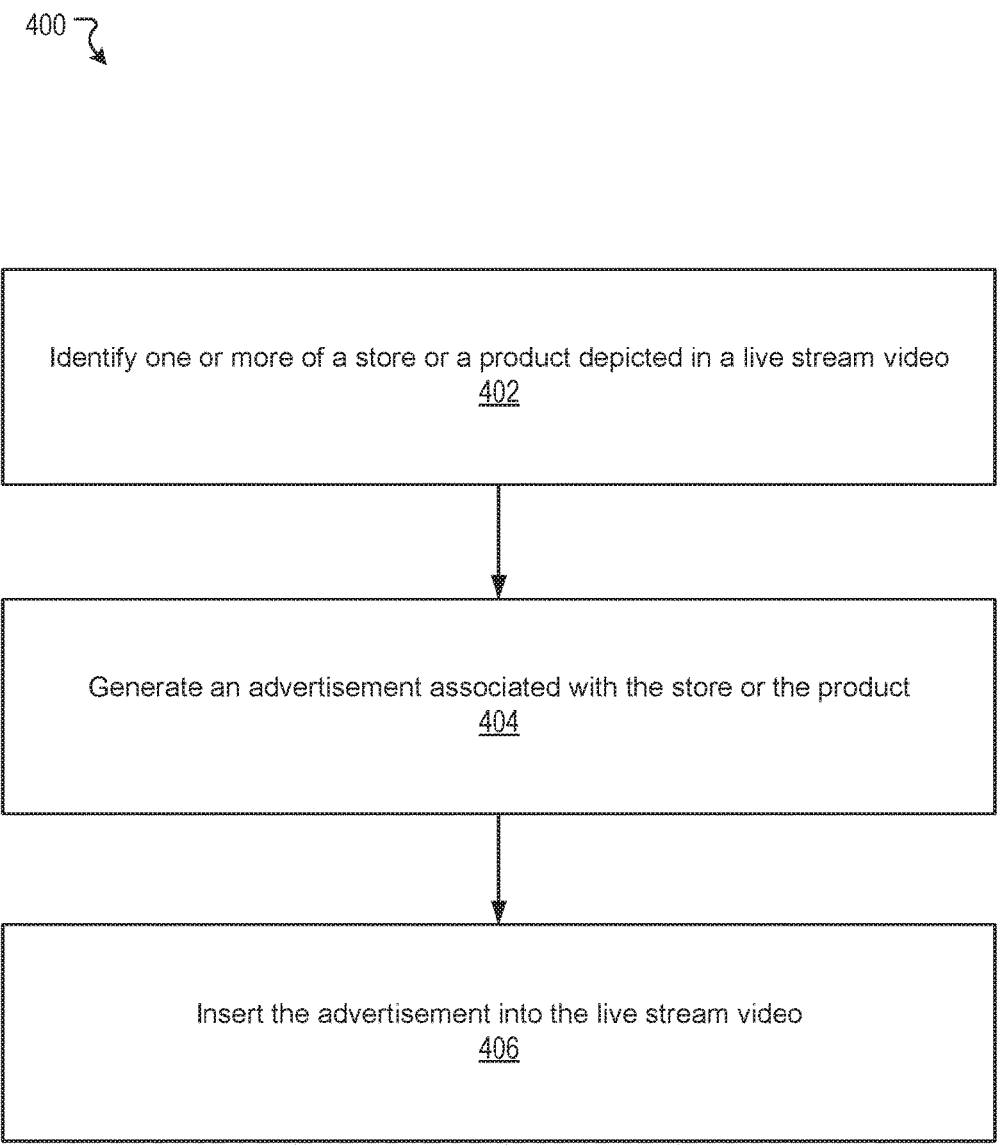
FIG. 4 illustrates an example first method for providing advertisements in live stream videos, according to an embodiment of the present disclosure.

FIG. 4 illustrates an example first method 400 for providing advertisements in live stream videos, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can identify one or more of a store or a product depicted in a live stream video. At block 404, the example method 400 can generate an advertisement associated with the store or the product. At block 406, the example method 400 can insert the advertisement into the live stream video. Other suitable techniques that incorporate various features and embodiments of the present disclosure are possible.

Figure 5:
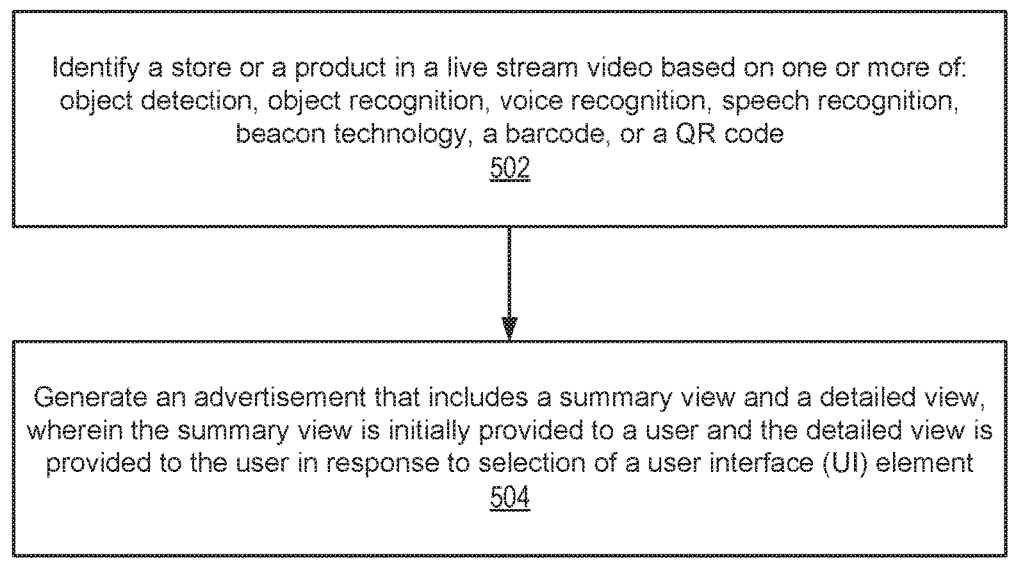
FIG. 5 illustrates an example second method for providing advertisements in live stream videos, according to an embodiment of the present disclosure.

FIG. 5 illustrates an example second method 500 for providing advertisements in live stream videos, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can identify a store or a product in a live stream video based on one or more of: object detection, object recognition, voice recognition, speech recognition, beacon technology, a barcode, or a QR code. At block 504, the example method 500 can generate an advertisement that includes a summary view and a detailed view, wherein the summary view is initially provided to a user and the detailed view is provided to the user in response to selection of a user interface (UI) element. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
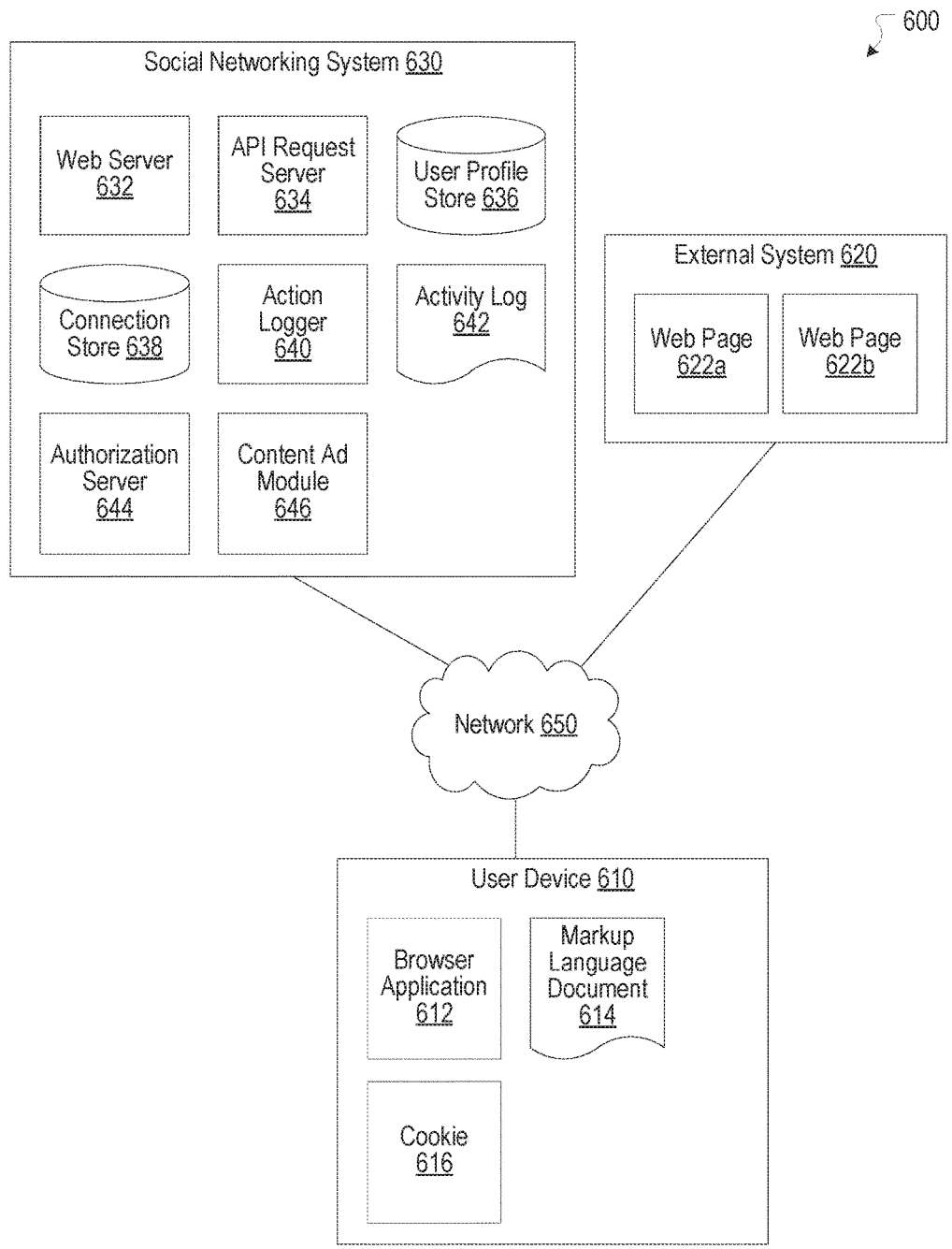
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content ad module 646. The content ad module 646 can be implemented with the content ad module 102, as discussed in more detail herein. In some embodiments, one or more functionalities of the content ad module 646 can be implemented in the user device 610.

Hardware Implementation

Figure 7:
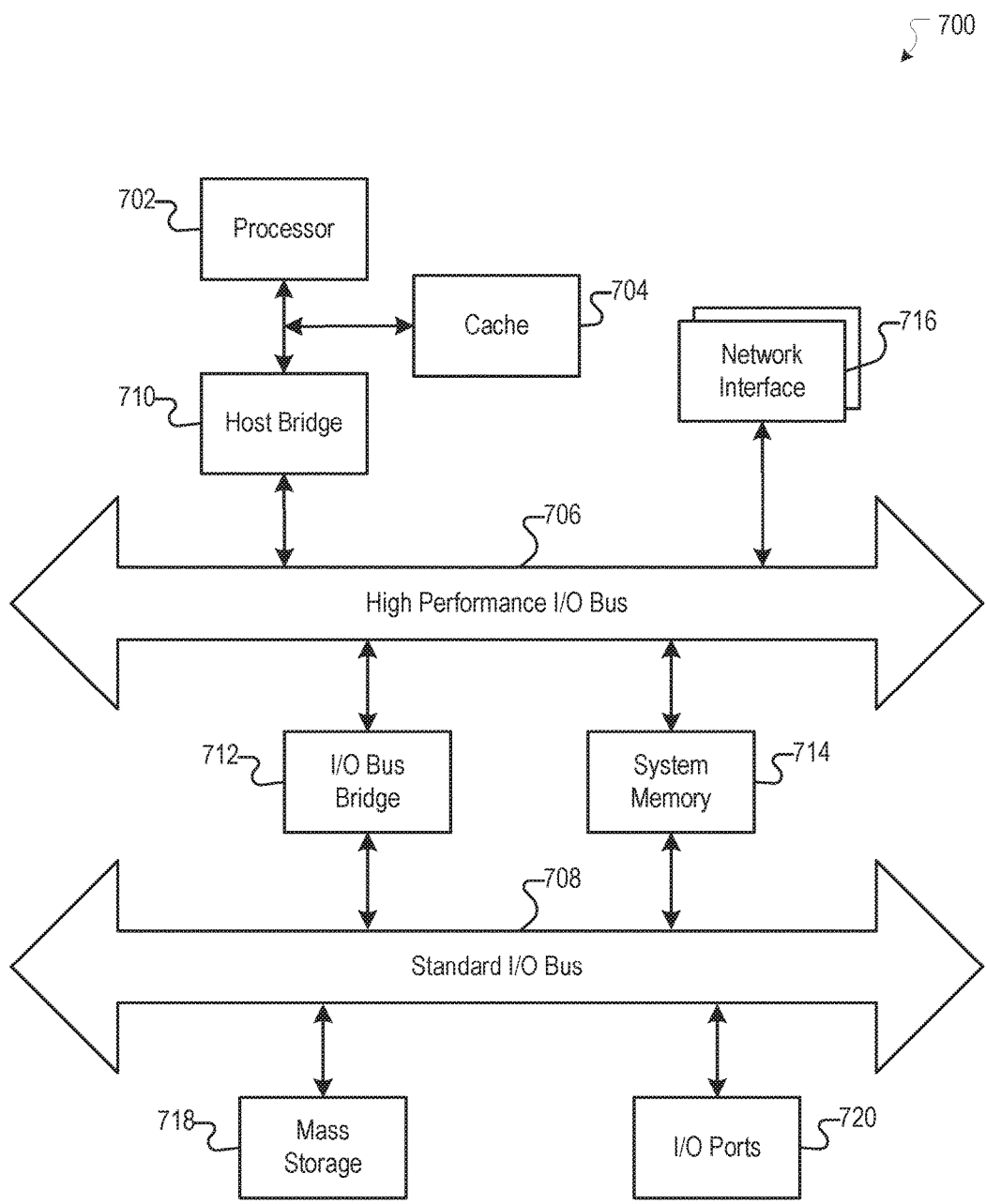
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   identifying, by a computing system, a plurality of stores or a plurality of products simultaneously depicted in a live stream video;
   generating, by the computing system, a set of advertisements associated with the plurality of stores or the plurality of products;
   inserting, by the computing system, a first subset of the set of advertisements into the live stream video in sequence, wherein the first subset of advertisements are provided as the live stream video depicts the plurality of stores or the plurality of products; and
   inserting, by the computing system, a second subset of the set of advertisements into the end of the live stream video.

2. The computer-implemented method of claim 1, wherein the plurality of stores or the plurality of products are identified based on one or more of: object detection, object recognition, voice recognition, speech recognition, beacon technology, a barcode, or a QR code.

3. The computer-implemented method of claim 1, wherein the set of advertisements are associated with a summary view and a detailed view, wherein the summary view is initially provided to a user and the detailed view is provided to the user in response to selection of a user interface (UI) element.

4. The computer-implemented method of claim 1, wherein the set of advertisements are provided in the live stream video as an overlay.

5. The computer-implemented method of claim 1, wherein the first subset of advertisements are provided a threshold distance from the identified store or the product in the live stream video.

6. The computer-implemented method of claim 1, wherein the set of advertisements are provided in a particular section of a user interface providing the live stream video.

7. The computer-implemented method of claim 1, wherein a user associated with the live stream video opts in to inserting advertisements into the live stream video or all live stream videos of the user.

8. The computer-implemented method of claim 1, wherein a user associated with the live stream video approves the set of advertisements for insertion into the live stream video.

9. The computer-implemented method of claim 3, wherein the summary view includes one or more of: an image associated with one of the plurality of stores, a name of one of the plurality of stores, an image of one of the plurality of products, or a name of one of the plurality of products.

10. The computer-implemented method of claim 3, wherein the detailed view includes one or more of: a website of one of the plurality of stores, details relating to one of the plurality of stores, a webpage of one of the plurality of products, details relating to one of the plurality of products, or a media content item.

11. A system comprising:
    at least one hardware processor; and
    a memory storing instructions that, when executed by the at least one processor, cause the system to perform:
      identifying a plurality of stores or a plurality of products simultaneously depicted in a live stream video;
      generating a set of advertisements associated with the plurality of stores or the plurality of products;
      inserting a first subset of the set of advertisements into the live stream video in sequence, wherein the first subset of advertisements are provided as the live stream video depicts the plurality of stores or the plurality of products; and
      inserting a second subset of the set of advertisements into the end of the live stream video.

12. The system of claim 11, wherein the plurality of stores or the plurality of products are identified based on one or more of: object detection, object recognition, voice recognition, speech recognition, beacon technology, a barcode, or a QR code.

13. The system of claim 11, wherein the set of advertisements are associated with a summary view and a detailed view, wherein the summary view is initially provided to a user and the detailed view is provided to the user in response to selection of a user interface (UI) element.

14. The system of claim 13, wherein the summary view includes one or more of: an image associated with one of the plurality of stores, a name of one of the plurality of stores, an image of one of the plurality of products, or a name of one of the plurality of products.

15. The system of claim 13, wherein the detailed view includes one or more of: a website of one of the plurality of stores, details relating to one of the plurality of stores, a webpage of one of the plurality of products, details relating to one of the plurality of products, or a media content item.

16. A non-transitory computer readable medium including instructions that, when executed by at least one hardware processor of a computing system, cause the computing system to perform a method comprising:
identifying a plurality of stores or a plurality of products simultaneously depicted in a live stream video;
generating a set of advertisements associated with the plurality of stores or the plurality of products;
inserting a first subset of the set of advertisements into the live stream video in sequence, wherein the first subset of advertisements are provided as the live stream video depicts the plurality of stores or the plurality of products; and
inserting a second subset of the set of advertisements into the end of the live stream video.

17. The non-transitory computer readable medium of claim 16, wherein the plurality of stores or the plurality of products are identified based on one or more of: object detection, object recognition, voice recognition, speech recognition, beacon technology, a barcode, or a QR code.

18. The non-transitory computer readable medium of claim 16, wherein the set of advertisements are associated with a summary view and a detailed view, wherein the summary view is initially provided to a user and the detailed view is provided to the user in response to selection of a user interface (UI) element.

19. The non-transitory computer readable medium of claim 18, wherein the summary view includes one or more of: an image associated with one of the plurality of stores, a name of one of the plurality of stores, an image of one of the plurality of products, or a name of one of the plurality of products.

20. The non-transitory computer readable medium of claim 18, wherein the detailed view includes one or more of: a web site of one of the plurality of stores, details relating to one of the plurality of stores, a webpage of one of the plurality of products, details relating to one of the plurality of products, or a media content item.

* * * * *